US010250054B2

(12) United States Patent
Lueth et al.

(10) Patent No.: US 10,250,054 B2
(45) Date of Patent: Apr. 2, 2019

(54) ENERGY STORAGE SYSTEM AND METHOD FOR INCREASING THE EFFICIENCY OF AN ENERGY STORAGE SYSTEM

(71) Applicant: TRUMPF Huettinger GmbH + Co. KG, Freiburg (DE)

(72) Inventors: Thomas Lueth, Freiburg (DE); Ulrich Richter, Freiburg (DE)

(73) Assignee: TRUMPF Huettinger GmbH + Co. KG, Freiburg (DE)

( * ) Notice: Subject to any disclaimer, the term of this patent is extended or adjusted under 35 U.S.C. 154(b) by 224 days.

(21) Appl. No.: 15/208,965

(22) Filed: Jul. 13, 2016

(65) Prior Publication Data

US 2016/0322845 A1 Nov. 3, 2016

Related U.S. Application Data

(63) Continuation of application No. PCT/EP2015/050623, filed on Jan. 15, 2015.

(30) Foreign Application Priority Data

Jan. 17, 2014 (DE) .................. 10 2014 200 858

(51) Int. Cl.
*H02J 7/00* (2006.01)
*H02J 3/32* (2006.01)
(Continued)

(52) U.S. Cl.
CPC .............. *H02J 7/0052* (2013.01); *H02J 3/32* (2013.01); *H02J 3/36* (2013.01); *H02J 7/007* (2013.01);
(Continued)

(58) Field of Classification Search
CPC ........ H02J 7/0052; H02J 7/007; H02J 7/0014; H02J 7/0068; H02J 3/32; H02J 3/36; H02M 3/24
(Continued)

(56) References Cited

U.S. PATENT DOCUMENTS 3,673,485 A * 6/1972 Vital ................. H02J 7/0091
  315/241 R
8,294,392 B2 * 10/2012 Krejtschi ................ H02J 3/30
  180/65.235
(Continued)

FOREIGN PATENT DOCUMENTS

DE 102009054485 A1 6/2011
DE 102010027854 A1 10/2011
(Continued)

OTHER PUBLICATIONS

International Search Report for corresponding PCT Application No. PCT/EP2015/050623, dated Mar. 3, 2015, 6 pages.
(Continued)

*Primary Examiner* — M Baye Diao
(74) *Attorney, Agent, or Firm* — Fish & Richardson P.C.

(57) ABSTRACT

An energy storage system including an energy store with a plurality of flow batteries, a first voltage converter, an intermediate circuit connected to the first voltage converter, a second voltage converter connected to the intermediate circuit and a first of the batteries, a third voltage converter connected to the intermediate circuit and a second of the batteries, and a controller connected to the first, second, and third voltage converters. The controller is configured to simultaneously control a power flow direction of the second voltage converter and a power flow direction of the third voltage converter such that the power flow direction of the second voltage controller is in an opposite direction of the power flow direction of the third voltage controller, to
(Continued)

control a power flow direction of the first voltage controller, and to charge and discharge the batteries.

20 Claims, 1 Drawing Sheet

(51) Int. Cl.
 *H02J 3/36* (2006.01)
 *H02J 9/06* (2006.01)
 *H02M 3/24* (2006.01)
(52) U.S. Cl.
 CPC ............ *H02J 7/0068* (2013.01); *H02M 3/24* (2013.01); *H02J 7/0014* (2013.01); *H02J 9/062* (2013.01); *H02J 2007/0059* (2013.01); *Y02E 60/60* (2013.01)
(58) Field of Classification Search
 USPC .................................................. 320/128, 134
 See application file for complete search history.

(56) References Cited

U.S. PATENT DOCUMENTS

| | | | | |
|---|---|---|---|---|
| 8,901,866 | B2* | 12/2014 | Sakai | H02J 3/30 307/66 |
| 9,455,578 | B2* | 9/2016 | Kim | H02J 7/00 |
| 2005/0156431 | A1* | 7/2005 | Hennessy | F03D 9/00 290/44 |
| 2011/0109158 | A1* | 5/2011 | Olsen | B60L 3/0069 307/10.1 |
| 2012/0047725 | A1* | 3/2012 | Gschweitl | H01M 10/0525 29/730 |
| 2013/0002026 | A1 | 1/2013 | Mizutani et al. | |
| 2013/0113294 | A1 | 5/2013 | Kaplan et al. | |
| 2013/0127396 | A1 | 5/2013 | Triebel et al. | |
| 2015/0002099 | A1* | 1/2015 | Smedley | H02J 7/0018 320/134 |
| 2017/0012546 | A1* | 1/2017 | Komiya | H02M 1/088 |

FOREIGN PATENT DOCUMENTS

| | | |
|---|---|---|
| EP | 2424069 A2 | 2/2012 |
| QA | WO2012146463 A1 | 11/2012 |
| WO | WO2011070078 A2 | 6/2011 |

OTHER PUBLICATIONS

Nourai, Ali, "Installation of the First Distributed Energy Storage System at American Electric Power", Sandia Report, SAND2007-3580, Unlimited Release, printed Jun. 2007, Sandia National Laboratories, 54 pages.

* cited by examiner

ENERGY STORAGE SYSTEM AND METHOD FOR INCREASING THE EFFICIENCY OF AN ENERGY STORAGE SYSTEM

CROSS-REFERENCE TO RELATED APPLICATIONS

This application is a continuation and claims priority under 35 U.S.C. § 120 to PCT Application No. PCT/EP2015/050623, filed on Jan. 15, 2015, which claims priority to German Application No. DE 10 2014 200 858.1, filed on Jan. 17, 2014. The contents of both of these priority applications are incorporated herein by reference in their entirety.

TECHNICAL FIELD

The invention relates to energy storage systems and methods of controlling energy storage systems to increase energy storages system efficiency.

BACKGROUND

Alternative energies are becoming more and more important. The issue with alternative energies such as solar energy or wind power is that the times at which energy is generated cannot be influenced and surplus energy has to be stored temporarily so that it is available when energy cannot be generated. It is therefore necessary to use energy storage systems. Energy storage systems are, however, subject to losses which should be avoided.

SUMMARY

The invention relates to an energy storage system including a first voltage converter which can be connected to a power grid, an intermediate circuit that is connected to the first voltage converter, and at least one second and one third voltage converter which are connected to the intermediate circuit, at least one energy store being connectable to each second and third voltage converter.

Furthermore, the invention relates to a method for increasing the efficiency of an energy storage system that comprises an intermediate circuit and at least two voltage converters which are connected to an intermediate circuit, at least one energy store being connectable to each voltage converter.

An object of the present invention is to provide an energy storage system and a method for storing energy to increase the energy efficiency of the energy storage system.

One aspect of the invention is an energy storage system including a first voltage converter which can be connected to a power grid, an intermediate circuit that is connected to the first voltage converter, and at least one second and one third voltage converter connected to an intermediate circuit, at least one energy store being connectable to each second and third voltage converter, wherein the energy storage system comprises a controller which is connected to the second and third voltage converters and is designed to control the power flow direction of the second and third voltage converters, in particular being designed to simultaneously control the power flow direction in the second voltage converter in the opposite direction to the power flow direction in the third voltage converter. This measure makes it possible not only to transfer energy from an energy generator to an energy store and then from the energy store to a power grid, but also to transfer energy from one energy store to another energy store inside the energy storage system. This can be expedient in terms of energy. Losses can thus be significantly reduced. In particular, the energy storage system according to the invention allows for energy to be transferred in this way in any operating state of the overall system.

The energy stores can be conventional batteries or electrochemical or physical membranes. For example, flow batteries (redox flow cells) may be provided as energy stores.

The controller can be designed to actuate the second and third voltage converters such that energy is conducted from the energy store connection of the second voltage converter to the energy store connection of the third voltage converter. In the process, the energy is conducted from the energy store connection of the second voltage converter to the energy store connection of the third voltage converter via the intermediate circuit.

Furthermore, the controller may be designed to monitor the voltage at the second and third voltage converters, in particular the voltages at the energy store connections of the voltage converters. As a result, it can be identified whether energy should be transmitted from an energy store connected to one of the voltage converters to an energy store connected to the second voltage converter.

Furthermore, the controller can be designed to determine the charge status or charge state of the connectable energy stores. This information can also help decide whether one of the energy stores should be charged using the energy from the other energy store.

The controller can also be designed to control the power of the voltage converters. As a result, the storage state or charge state of the connectable energy stores can be controlled.

The controller can also be connected to the first voltage converter and can be designed to control the power flow direction of the first voltage converter. Therefore, the controller can influence whether energy is transferred from the energy storage system to the power grid via the first voltage converter or whether, conversely, the connectable energy stores of the energy storage system are connected to the power grid via the first voltage converter, such that energy from the power grid is stored in the connectable energy stores.

The first voltage converter can be either line-commutated or self-commutated. A line-commutated first voltage converter is advantageous when the power grid is a public grid or a grid having a directly coupled rotary machine. A self-commutated first voltage converter is advantageous when the power grid is an isolated operation that does not have directly coupled rotary machines.

The first voltage converter can be switched off, in order to keep losses low. In particular, the controller can be designed to switch off the first voltage converter while the second and third voltage converters continue to operate and transfer energy from one energy store to the other. Energy can therefore be transferred inside the energy storage system in order to increase the energy efficiency of the energy storage system, without energy being used in the process to operate the first voltage converter, or without any energy being provided to the power grid via the first voltage converter.

The same kind of energy stores or different energy stores can be connectable to the energy storage system. For example, conventional accumulators, flow batteries (redox flow cells) or other electrochemical or physical membranes can be used. These different energy stores can be connectable in parallel with the energy storage system according to the invention, or the energy storage system can be connected to just one type of energy store, for example, only to flow batteries.

The controller can be designed to charge and discharge a plurality of flow batteries, all of which are connected to a common pair of electrolytes and can be connected to the energy storage system. A system of this kind can function very energy-efficiently.

The controller can be designed to charge and discharge a plurality of flow batteries and at least one other type of additional energy store. A lead-acid accumulator can be provided as another type of energy store, for example. The controller can be designed to start up the flow batteries using another type of energy store even if the flow batteries themselves have insufficient charge to be able to restart by themselves.

The first voltage converter can be formed as a bidirectional inverter and/or the second and third voltage converters can be formed as bidirectional DC/DC converters. The first voltage converter can in particular be formed as a bidirectional AC/DC converter. The bidirectional AC/DC converter makes it possible to draw energy from a single-phase or multiphase power grid and supply it to the intermediate circuit, or to draw energy from the energy stores via the intermediate circuit and feed it into the single-phase or multiphase power grid.

If the DC/DC converter is bidirectional, energy can be transmitted from the energy stores to the intermediate circuit, and energy can also be transferred from the intermediate circuit to the energy stores.

The second and the third voltage converters can be isolated in terms of potential. This can ensure that energy is transferred between two energy stores solely via the voltage converters.

Transformers can be provided in the second and in the third voltage converter. A high intermediate circuit voltage can thus be achieved in an energy-efficient manner.

The voltage of the intermediate circuit can be between 700 V and 1500 V. The voltage of the intermediate circuit can be 10 times, or more than ten times, the voltage at the connectable energy stores. The first voltage converter can then also convert the energy very efficiently and can be produced in a cost-effective manner. In particular, said converter does not need to be isolated in terms of potential. In addition, only a relatively low current flows in the intermediate circuit compared with the current that would flow if the intermediate circuit voltage was, for example, 48 V. Copper losses are thus reduced. Less copper is also required, keeping the costs of the energy storage system low.

The first voltage converter can be isolated in terms of potential.

The first voltage converter can be designed for connection to a single-phase or multiphase, in particular three-phase, power grid.

Each voltage converter can be formed as a resonant voltage converter. In this way, energy can be converted in a very efficient manner.

The controller can be designed as a self-learning controller. The controller can in particular be designed to learn to run individual energy stores empty or to recharge them, depending on the daily current requirement or cycle.

The controller can comprise a communication connection to a "smart grid". The term "smart grid" includes the communicative networking and control of current generators, stores, electrical consumers and grid operating means in energy-transmission grids and energy distribution grids for the electricity supply. A controller of this kind can also be advantageous in an isolated grid. A controller of this kind can also be advantageous in a quasi-isolated grid. A quasi-isolated grid has a connection to the public grid, but uses said connection in a controlled manner. Thus, electrical energy can be stored when it is inexpensive in the public grid and then made available to the quasi-isolated grid. When the electrical energy in the public grid is more expensive, energy can be transferred from the energy stores to the quasi-isolated grid. In addition, the energy can also be made available to the public grid when the energy in the public grid can be sold for a high price. The energy storage system is designed in particular to buffer excess capacities in the public grid in the connectable energy stores and to make them available in the public grid at times of increased energy requirement. This can be done using an energy storage system, as described above, in an extraordinarily quick and efficient manner.

The invention also includes an energy storage system arrangement including a plurality of energy storage systems according to the invention, where the energy storage systems have a common controller. This makes it possible to first transfer energy between the energy stores inside an energy storage system, in order to keep losses low. It is then possible to transfer energy between the energy storage systems so as to further reduce losses. In particular, the losses sustained by an energy store can be reduced. The common controller makes it possible to optimize both the flow of energy between the individual energy stores and between the energy storage systems.

This one common controller can be formed as a master controller in an energy storage system. The master controller can then be connected to the controllers of the other energy storage systems, which are then formed as slave controllers.

In an energy storage system arrangement of this kind, the intermediate circuit voltage of two energy storage systems can be or is combined. The energy can then be transferred by energy stores of different energy storage systems in a particularly energy-saving manner.

The invention also includes a method for increasing the energy efficiency of an energy storage system that comprises an intermediate circuit and at least two voltage converters which are connected to the intermediate circuit, at least one energy store being connectable to each voltage converter, the power flow direction of the voltage converters being controlled, in particular the power flow direction in one of the power transformers being controlled, in particular simultaneously, in the opposite direction to the power flow direction in the other voltage converter. This method makes it possible to transfer energy from one energy store to another energy store via the voltage converters and intermediate circuit. As a result, the energy efficiency of an energy storage system can be increased.

The energy storage system can comprise an additional voltage converter which is connected to the intermediate circuit, energy being transferred from at least one energy store to the additional voltage converter, or vice versa, via one of the first two voltage converters and the intermediate circuit. As a result, energy can be transferred from an energy store to a power grid that is connected to an additional voltage converter. In addition, it is possible to transfer energy from the power grid to an energy store, where the energy is stored.

The power of the voltage converters can be controlled. In particular, the power of the voltage converters can be controlled in such a way that energy losses are kept low. The charge state of the energy stores can also be monitored for this purpose.

Furthermore, it is advantageous in terms of energy efficiency for the additional voltage converter to be switched off while the two first voltage converters continue to operate and transfer energy from one energy store to the other energy store.

Instead of providing several energy stores in a partially charged state, it may be advantageous in terms of energy to completely empty one energy store, in particular by supplying the energy stored therein to another energy store.

Energy can first be transferred between at least two energy stores of the energy storage system, and then energy can be transferred between at least two energy storage systems. The energy efficiency of the overall system can thus be improved.

Additional features and advantages of the invention will become apparent from both the following description of an embodiment of the invention, with reference to the figures of the drawings, which show details essential to the invention, and the claims. The individual features can each be implemented per se or together in any combination in a variant of the invention.

A preferred embodiment of the invention is shown schematically in the drawings, and will be explained hereinafter in more detail with reference to the figures of the drawings, in which:

DETAILED DESCRIPTION

Figure 1:
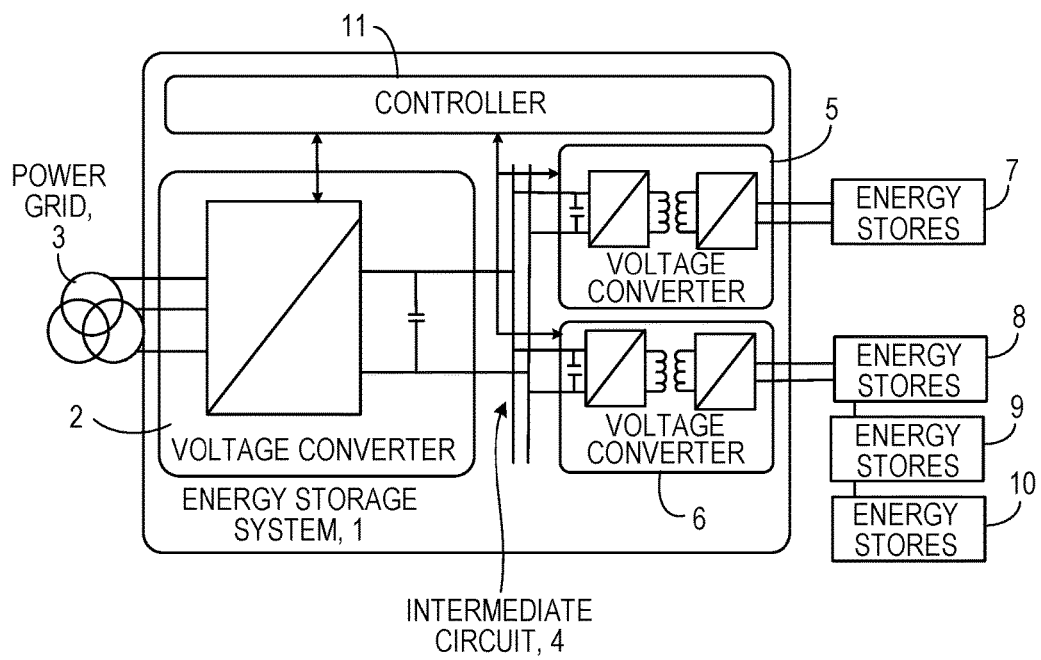
FIG. 1 is a schematic view of an energy storage system.

FIG. 1 shows an energy storage system 1 including a first voltage converter 2 that can be connected to a single-phase or multiphase power grid 3. The first voltage converter 2 can be formed as an AC/DC converter, in particular a bidirectional AC/DC converter, and is connected to an intermediate circuit 4 to which a second and a third voltage converter 5, 6 are connected in turn. The voltage converters 5, 6 may be formed as DC/DC converters, in particular bidirectional DC/DC converters, for example. More than the two voltage converters 5, 6 shown can be connected to the intermediate circuit 4. The voltage converters 5, 6 can each be connected to one or more energy stores 7 to 10, the voltage converter 5 being connected to the energy store 7 and the voltage converter 6 being connected to the energy stores 8 to 10 in the embodiment shown. The energy stores 8 to 10 could also be connected in parallel with the voltage converter 6.

Furthermore, the energy storage system 1 comprises a controller 11 which is connected to both the first voltage converter 2 and the voltage converters 5, 6 and is designed to control said voltage converters. The controller 11 is designed in particular to control the power flow, in particular the direction of the power flow, in the voltage converters 5, 6. In the process, the controller 11 can actuate the voltage converters 5, 6 in such a way that energy can be transferred, for example, from the energy store 7 to the energy store 8, or vice versa, via the voltage converter 5, the intermediate circuit 4 and the voltage converter 6. During this transfer, the controller 11 can switch off the voltage converter 2. Furthermore, the controller 11 can actuate the voltage converters 2, 5, 6 in such a way that power flows from the power grid 3 to the energy stores 7 to 10 via the voltage converter 2, the intermediate circuit 4 and the voltage converters 5, 6.

The controller can in this case also actuate just one of the voltage converters 5, 6 such that energy is only transferred to the energy store 7, for example. Furthermore, the controller 11 can control the power flow such that energy stored in the energy store 7 is fed into the power grid 3 via the voltage converter 5, the intermediate circuit 4 and the voltage converter 2, for example.

The fact that the voltage converter 2 can be switched off and energy can be transferred between the energy stores 7 to 10 means that the energy efficiency of the energy storage system 1 can be increased.

Figure 2:
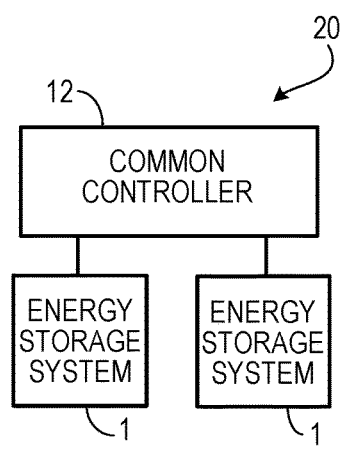
FIG. 2 is a schematic view of an energy storage system arrangement.

FIG. 2 shows a plurality of energy storage systems 1, which are formed in accordance with the energy storage system 1 in FIG. 1, connected to a common controller 12. In this case, the controller 12 and the controller 11 can be combined. The arrangement in FIG. 2, shows an energy storage system arrangement 20. This arrangement makes it possible to first optimize the energy storage systems 1 in terms of power loss by emptying one or more energy stores 7 to 10 by, for example, transferring the energy therein to one or more of the other energy stores 7 to 10. Energy can then be transferred from one of the energy storage systems 1 to the other energy storage system 1, in order to keep losses low.

What is claimed is:

1. An energy storage system comprising:
   an energy store comprising a plurality of flow batteries each of which are connected to a common pair of electrolytes;
   an AC/DC-voltage converter configured to be connected to a power grid;
   an intermediate circuit connected to a DC-side of the AC/DC-voltage converter;
   a first DC/DC-voltage converter connected to the intermediate circuit and connected to at least a first one of the flow batteries;
   a second DC/DC-voltage converter connected to the intermediate circuit and connected to at least a second one of the flow batteries; and
   a controller connected to the AC/DC-voltage converter, the first DC/DC-voltage converter, and the second DC/DC-voltage converter, wherein the controller is configured to:
   simultaneously control a power flow direction of the first DC/DC-voltage converter and a power flow direction of the second DC/DC-voltage converter such that the power flow direction of the first DC/DC-voltage converter is in an opposite direction of the power flow direction of the second DC/DC-voltage converter, and
   charge and discharge the flow batteries.

2. The system of claim 1, wherein the controller is configured to actuate the first DC/DC-voltage converter and the second DC/DC-voltage converter such that energy is conducted from the first one of the flow batteries connected to the first DC/DC-voltage converter to the second one of the flow batteries connected to the second DC/DC-voltage converter.

3. The system of claim 1, wherein the controller is configured to switch off the AC/DC voltage converter while the first DC/DC-voltage converter and the second DC/DC-voltage converter operate to transfer energy between the first one of the flow batteries and the second one of the flow batteries.

4. An energy storage system arrangement comprising:
   a plurality of energy storage systems of claim 1; and a common controller connected to each of the plurality of energy storage systems.

5. A method of increasing energy efficiency of an energy storage system that comprises an intermediate circuit, an AC/DC-voltage converter connected to the intermediate circuit, a first DC/DC-voltage converter connected to the intermediate circuit, a second DC/DC-voltage converter connected to the intermediate circuit, and at least one energy store connected to each of the first DC/DC-voltage converter and the second DC/DC-voltage converter, wherein the at least one energy store connected to the first DC/DC-voltage converter comprises a plurality of flow batteries each of which are connected to a common pair of electrolytes, the method comprising:

controlling, by a controller in communication with the first DC/DC-voltage converter and the second DC/DC voltage controller, a first power flow direction of the first DC/DC-voltage converter in a direction opposite to a second power flow direction of the second DC/DC-voltage converter.

6. The method of claim 5, wherein energy is transferred between the at least one energy store connected to the AC/DC-voltage converter and the at least one energy store connected to the first DC/DC-voltage converter, and wherein the energy is transferred through the AC/DC-voltage converter, the intermediate circuit, and the first DC/DC-voltage converter.

7. The method of claim 5, comprising:

transferring energy between the at least one energy store and the second DC/DC-voltage converter through the intermediate circuit and at least one of the AC/DC-voltage converter and the second DC/DC-voltage converter.

8. The method of claim 5, wherein at least one energy store is completely emptied.

9. An energy storage system comprising:

an AC/DC-voltage converter configured to be connected to a power grid;
an intermediate circuit connected to a DC-side of the AC/DC-voltage converter;
a first DC/DC-voltage converter connected to the intermediate circuit and configured to be connected to a first energy store;
a second DC/DC-voltage converter connected to the intermediate circuit and configured to be connected to a second energy store that comprises at least one flow battery; and
a controller connected to the AC/DC-voltage converter, the first DC/DC-voltage converter, and the second DC/DC-voltage converter, wherein the controller is configured to:

simultaneously control a power flow direction of the first DC/DC-voltage converter and a power flow direction of the second DC/DC-voltage converter such that the power flow direction of the first DC/DC-voltage converter is in an opposite direction of the power flow direction of the second DC/DC-voltage converter, and
start up the at least one flow battery using power from the first energy store.

10. The system of claim 9, wherein the controller is configured to actuate the first DC/DC-voltage converter and the second DC/DC-voltage converter such that energy is conducted from the first energy store connected to the first DC/DC-voltage converter to the at least one flow battery connected to the second DC/DC-voltage converter.

11. The system of claim 9, wherein intermediate circuit is configured to operate at a voltage that is ten or more times larger than an operating voltage of the energy store.

12. An energy storage system arrangement comprising:
a plurality of energy storage systems of claim 9; and
a common controller connected to each of the plurality of energy storage systems.

13. The system of claim 9, wherein at least one of the AC/DC voltage converter, the first DC/DC voltage converter, and the second DC/DC voltage converter is a resonant voltage converter.

14. The system of claim 9, wherein the controller is a self-learning controller that is further configured to charge and discharge the first energy store and the second energy store based on a learned daily current cycle.

15. The system of claim 1, wherein intermediate circuit is configured to operate at a voltage that is ten or more times larger than an operating voltage of the energy store.

16. The system of claim 1, wherein at least one of the AC/DC voltage converter, the first DC/DC voltage converter, and the second DC/DC voltage converter is a resonant voltage converter.

17. The system of claim 1, wherein the controller is a self-learning controller that is further configured to charge and discharge flow batteries based on a learned daily current cycle.

18. The method of claim 5, wherein the controller is a self-learning controller, the method further comprising charging and discharging the at least one energy store based on a learned daily current cycle.

19. The system of claim 1, wherein the controller is further configured to start up the flow batteries using a third energy store.

20. The method of claim 5, further comprising starting up the flow batteries using power from the at least one energy store connected to the second DC/DC-voltage converter.

* * * * *